United States Patent
Tanaka

(10) Patent No.: US 9,802,758 B2
(45) Date of Patent: Oct. 31, 2017

(54) STACKER CRANE AND METHOD FOR OPERATING SAME

(71) Applicant: Murata Machinery, Ltd., Kyoto-shi, Kyoto (JP)

(72) Inventor: Hiroshi Tanaka, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 199 days.

(21) Appl. No.: 14/760,513

(22) PCT Filed: Dec. 18, 2013

(86) PCT No.: PCT/JP2013/083844
§ 371 (c)(1),
(2) Date: Jul. 13, 2015

(87) PCT Pub. No.: WO2014/129066
PCT Pub. Date: Aug. 28, 2014

(65) Prior Publication Data
US 2015/0353281 A1 Dec. 10, 2015

(30) Foreign Application Priority Data
Feb. 20, 2013 (JP) .................................. 2013-030987

(51) Int. Cl.
*B65G 1/04* (2006.01)
*B66F 9/07* (2006.01)

(52) U.S. Cl.
CPC ............ *B65G 1/0407* (2013.01); *B66F 9/072* (2013.01)

(58) Field of Classification Search
CPC ... B65G 1/00; B65G 1/02; B65G 1/04; B65G 1/0407; B61B 3/00; B61B 3/02;
(Continued)

(56) References Cited

U.S. PATENT DOCUMENTS 7,281,608 B2 * 10/2007 Hansl .................. B65G 1/0407
187/226

FOREIGN PATENT DOCUMENTS

JP     2002-106414 A     4/2002

OTHER PUBLICATIONS

English translation of Official Communication issued in corresponding International Application PCT/JP2013/083844, dated Sep. 3, 2015.

(Continued)

*Primary Examiner* — R. J. McCarry, Jr.
(74) *Attorney, Agent, or Firm* — Keating & Bennett, LLP

(57) ABSTRACT

A stacker crane includes a lower carriage including a lower drive wheel, a lower travel motor, and a support located apart from the lower drive wheel; an upper carriage including an upper drive wheel and an upper travel motor that drives the upper drive wheel; and a mast fixed to the lower carriage, standing upward from the lower carriage and connected to the upper carriage, and including a transfer device capable of moving up and down. A displacement mechanism that raises and lowers the support is provided on the lower carriage between a grounded position supported by a lower rail and a retracted position lifted off the lower rail. The support is lowered to the grounded position when the stacker crane is installed between the lower rail and the upper rail and when the stacker crane is stopped for maintenance, and the support is raised to the retracted position when the stacker crane is operated.

11 Claims, 4 Drawing Sheets

(58) Field of Classification Search
CPC ....... B61B 10/00; B61B 10/001; B61B 10/02; B61B 10/022; B61B 13/00; B61B 13/02; B61B 13/04
See application file for complete search history.

(56) References Cited

OTHER PUBLICATIONS

Official Communication issued in International Patent Application No. PCT/JP2013/083844, dated Apr. 8, 2014.

* cited by examiner

F I G. 2
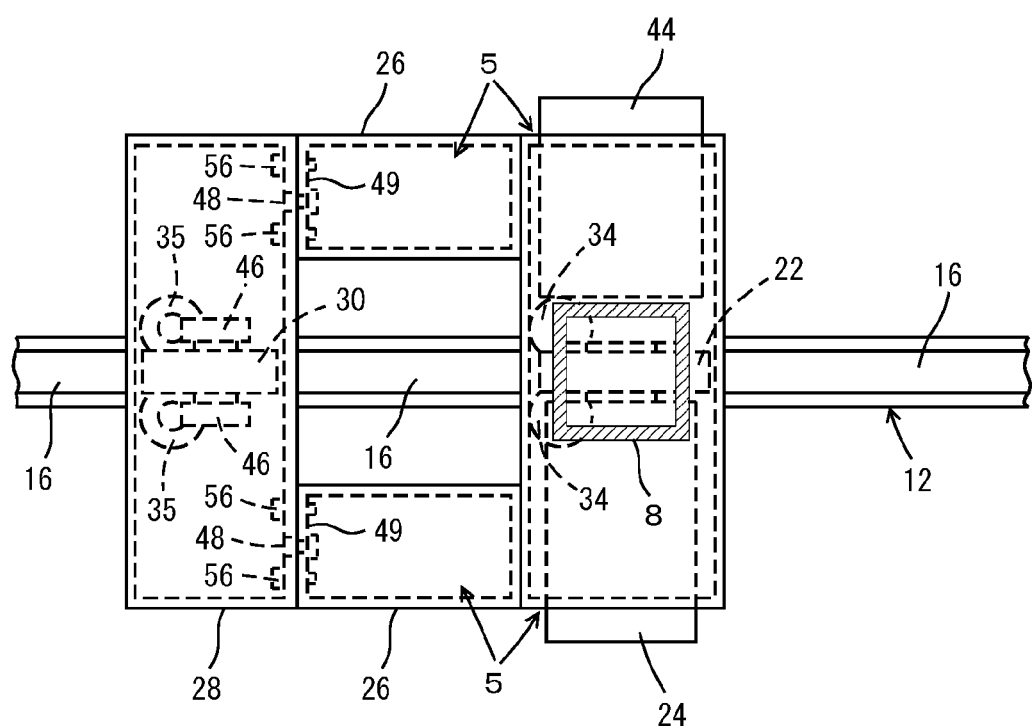

STACKER CRANE AND METHOD FOR OPERATING SAME

BACKGROUND OF THE INVENTION

1. Field of the Invention

The present invention relates to a stacker crane and a method for operating the same, and in particular relates to reducing stress between a mast and a lower frame.

2. Description of the Related Art

The applicant has proposed providing travel motors in upper and lower carriages of a stacker crane so as to cause the upper and lower carriages to travel in a synchronized manner (See, for example, JP 2002-106414A). If the upper and lower carriages run out of synchronization, a strong force is exerted on the connection between the mast and the carriages, and therefore, in JP 2002-106414A, the mast is attached pivotally to the lower carriage.

However, a pivotal mast is difficult to stand upright during installation of the stacker crane. Similarly, if the mast does not stand upright, it is difficult to perform maintenance on the stacker crane. Furthermore, if a mast with a large weight is to be pivoted, a large pivoting mechanism is needed.

SUMMARY OF THE INVENTION

Preferred embodiments of the present invention provide a stacker crane with a simple structure that significantly reduces stress exerted on a connection between a mast and a lower carriage during normal traveling, while the mast is stood upright during installation and maintenance of the stacker crane.

A stacker crane according to a preferred embodiment of the present invention includes a lower carriage including a lower drive wheel in contact with a lower rail, a lower travel motor that drives the lower drive wheel, and a support located apart from the lower drive wheel along a length direction of lower rail; an upper carriage including an upper drive wheel in contact with an upper rail, and an upper travel motor that drives the upper drive wheel; and a mast fixed to the lower carriage, standing upward from the lower carriage, connected to the upper carriage, and having a transfer device attached so as to be capable of being elevated, wherein the lower carriage is provided with a displacement mechanism that raises and lowers the support between a grounded position supported by the lower rail and a retracted position lifted upward off the lower rail.

In a method for operating a stacker crane according to another preferred embodiment of the present invention, the support is lowered to the grounded position and supported by the lower rail, when the stacker crane is installed between the lower rail and the upper rail and also when the stacker crane is stopped so as to perform maintenance, and the support is raised to the retracted position lifted upward off the lower rail when the stacker crane is operated.

A state is considered in which the upper carriage and the lower carriage run out of synchronized travel and the mast tilts from a perpendicular state. Here, if the support is in contact with the lower rail, a strong force is exerted on the connection between the mast and the lower carriage, and therefore high rigidity is required at the connection. By contrast, if the support is allowed to be raised and lowered between a grounded position and a retracted position and further, the support is retracted during operation of the stacker crane, or in other words, during normal operations excluding maintenance, testing, or the like, the strong force is not exerted on the connection if the mast tilts within an allowable range. As a result, the weight of the mast and the lower carriage is reduced, and the durability and reliability thereof are increased. Also, if the support is operated during installation of the stacker crane, during maintenance, and the like, the orientation of the lower carriage is stabilized, and the mast stands upright perpendicularly. Accordingly, the stacker crane is installed accurately and easily, and maintenance is also easier. Furthermore, since the mast may be fixed to the lower carriage, the structure of the stacker crane is simpler compared to the case where the mast is able to pivot with respect to the lower carriage.

Preferably, the lower carriage includes a main body including the lower drive wheel and the lower travel motor, and the support located either in front of or behind the main body, and the displacement mechanism includes at least an eccentric pin including a circular plate, a round bar including a base end that is integrated with the circular plate and is eccentric relative to the center of the circular plate, a screw portion provided at a leading end of the round bar, and a manipulation portion that rotates the circular plate, at least a receiving hole provided in the support for the circular plate or the round bar, and at least a receiving hole provided in the main body for the round bar or the circular plate. Thus, the support may be raised and lowered between the grounded position and the retracted position by rotating the eccentric pin with the manipulation portion.

A mechanism may be used in which a bottom surface of the support is directly in contact with the lower rail, but preferably, the support includes a roller that comes into contact with an upper surface of the lower rail at the grounded position and is lifted off the lower rail at the retracted position. Thus, not only is the mast kept upright by the support at the grounded position, but the stacker crane is easily moved by a manual push or the like during installation and during maintenance.

Preferably, the support includes at least a guide roller that faces a guide surface on an underside of the lower rail, is at an opposite position to the roller and is attached to the support with a gap between the guide roller and the guide surface of the lower rail both at the grounded position and at the retracted position. Thus, if the mast tilts toward the support beyond the allowable range, the roller will come into contact with the lower rail to prevent further tilting. Also, if the mast tilts toward the side opposite to the support beyond the allowable range, the guide roller will come into contact with the guide surface of the lower rail to prevent further tilting.

Preferably, when the support is grounded at the grounded position, along the length direction of the lower rail, the center of gravity of the mast and the position of contact between the lower drive wheel and the lower rail are the same. If the support is lowered to the grounded position, the weight from the mast is exerted directly on the point of contact between the drive wheel and the lower rail, and the mast stands upright perpendicularly. If two or more drive wheels are provided and are in contact with two or more lower rails, the center of gravity of the mast is preferably positioned on a line connecting the points of contact between the drive wheels and the lower rails.

Preferably, the displacement mechanism makes the support up and down with respect to the main body between the retracted position and the grounded position.

More preferably, the displacement mechanism is configured to make the mast perpendicular to the main body when the stacker crane is installed between the lower rail and the upper rail and also when the stacker crane is stopped to perform maintenance. This configuration makes it easier to perform installation and maintenance of the stacker crane. Also, if the support is retracted, operation of the stacker crane may be started from a state in which the mast is perpendicular to the lower carriage. Since the mast is perpendicular to the lower carriage, a moment of force that causes the mast to tilt is less likely to act thereon.

In particular, it is preferable that at a position along the length direction of the lower rail, the mast is fixed directly above the lower drive wheel. Thus, the weight from the mast is exerted directly on the point of contact between the lower drive wheel and the travel rail, and a moment of force that causes the mast to tilt is less likely to act thereon.

Most preferably, the support includes at least a roller in contact with an upper surface of the lower rail at the grounded position and lifted off the lower rail at the retracted position, and a guide roller facing the guide surface on the underside of the lower rail at an opposite position to the roller, the guide roller is attached to the support with a gap between the guide roller and the guide surface of the lower rail both at the grounded position and at the retracted position, neither the roller nor the guide roller comes into contact with the lower rail when tilting of the mast to the lower carriage is within the allowable range, and if the tilting of the mast to the lower carriage exceeds the allowable range, the roller or the guide roller comes into contact with the lower rail.

Thus, at the retracted position, the stacker crane may be moved by a manual push or the like with the roller. During operation of the stacker crane, even if the mast tilts within the allowable range due to the upper and lower carriages running out of synchronization for some reason, a strong force is not exerted on the connection between the mast and the lower carriage. Accordingly, the durability and reliability of the connection are improved, and the weight of the connection is reduced. Also, if the mast tilts beyond the allowable range, the roller comes into contact with the lower rail to prevent further tilting. Also, if the mast tilts beyond the allowable range in the opposite direction, the guide roller comes into contact with the guide surface of the lower rail to prevent further tilting.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 2 is a cross-sectional view taken along line A-A in FIG. 1.

DETAILED DESCRIPTION OF THE PREFERRED EMBODIMENTS

Figure 1:
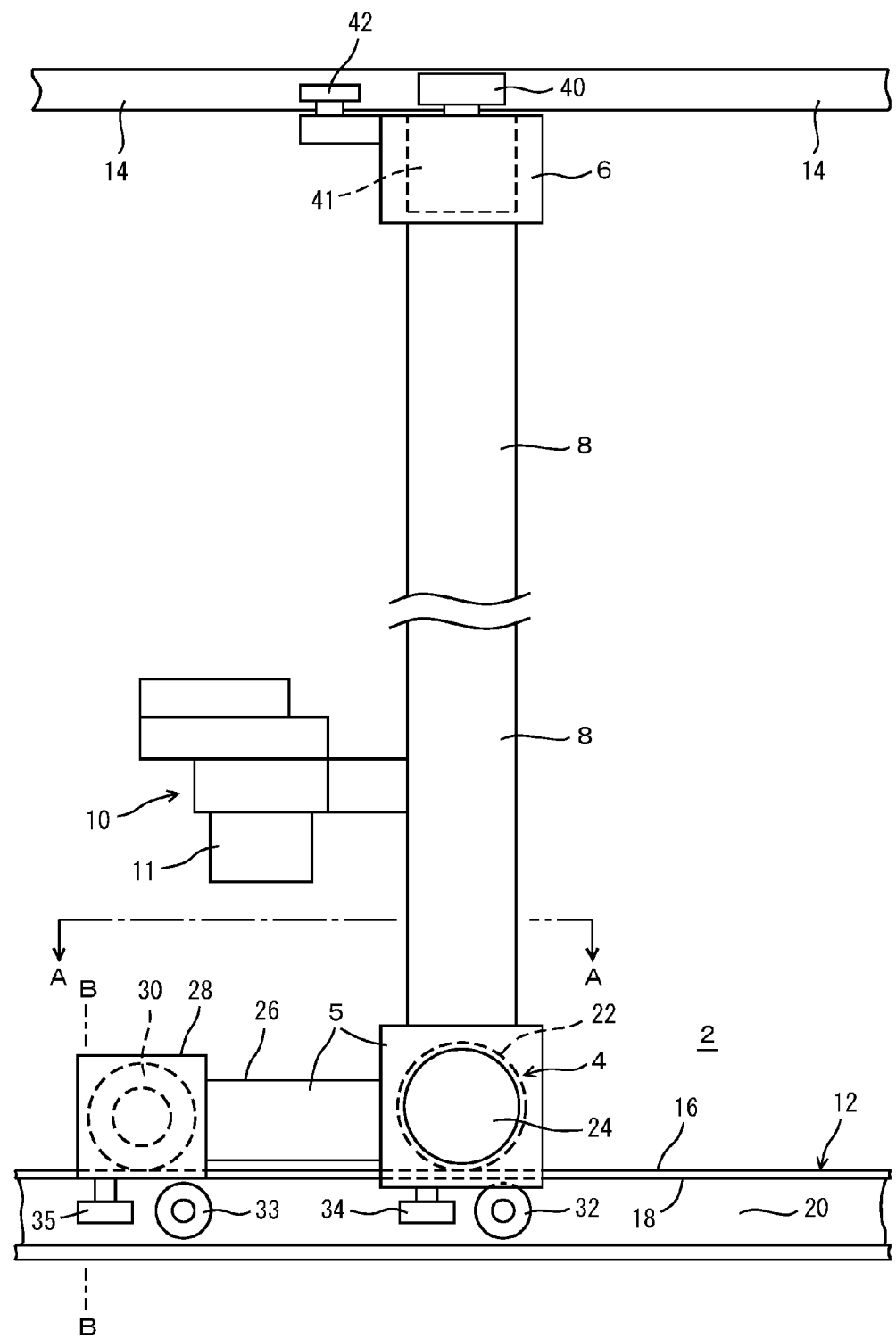
FIG. 1 is a partial cutout side view of a stacker crane and upper and lower travel rails according to a preferred embodiment of the present invention.

Hereinafter, preferred embodiments of the present invention will be described. The scope of the present invention should be construed based on the description of the claims and in accordance with the understanding of a person skilled in the art, with reference to the description of the specification and known techniques in the field.

FIGS. 1 to 4 show a stacker crane 2 according to a preferred embodiment of the present invention. In the drawings, reference numeral 4 indicates a lower carriage including a main body 5 and a support 28, reference numeral 6 indicates an upper carriage, and a mast 8 fixed to the lower carriage 4 connects the upper and lower carriages 4 and 6. The mast 8 may be fixed to the upper carriage 6 or be attached pivotally to the upper carriage 6. The mast 8 may be a perpendicular tube that raises and lowers a transfer device 10 such as a SCARA arm, and instead of directly raising and lowering the transfer device 10, the mast 8 may raise and lower an elevating platform on which a transfer device is mounted. Reference numeral 11 indicates a transfer motor that drives the transfer device 10.

The stacker crane 2 travels inside of an automated warehouse (not shown) or the like, the lower carriage 4 travels along a lower rail 12, and the upper carriage 6 travels along an upper rail 14. The upper surface of the lower rail 12 is a tread 16, the underside surface thereof is a guide surface 18, and reference numeral 20 indicates a side surface thereof. One drive wheel 22 and a travel motor 24 therefor are provided in the main body 5 of the lower carriage 4, for example. The support 28 is attached to the bridge 26 of the main body 5 and may be raised and lowered between a grounded position and a retracted position. In the grounded state, the support 28 is supported in contact with the tread 16 of the lower rail 12. In the retracted position, the support 28 is lifted and is not in contact with the tread 16 of the lower rail 12.

The support 28 includes one driven roller 30, for example. The main body 5 and the support 28 respectively include guide rollers 32 and 33 that face the guide surface 18, and guide rollers 34 and 35 that are guided by the side surface 20. The guide rollers 32 to 35 are provided in pairs on both the left and right of the lower rail 12, and the guide rollers 33 are separated from the guide surface 18 by a gap, when the support is at the grounded position and also when it is at the retracted position. When the mast 8 tilts forward beyond an allowable range, the guide rollers 33 come into contact with the guide surface 18 to restrict forward tilting. In the present specification, the left and right direction is the direction orthogonal or substantially orthogonal to the lower rail 12 or the upper rail 14 in a horizontal plane, and regarding front and rear, the main body 5 is in the front and the support 28 is in the rear.

Figure 3:
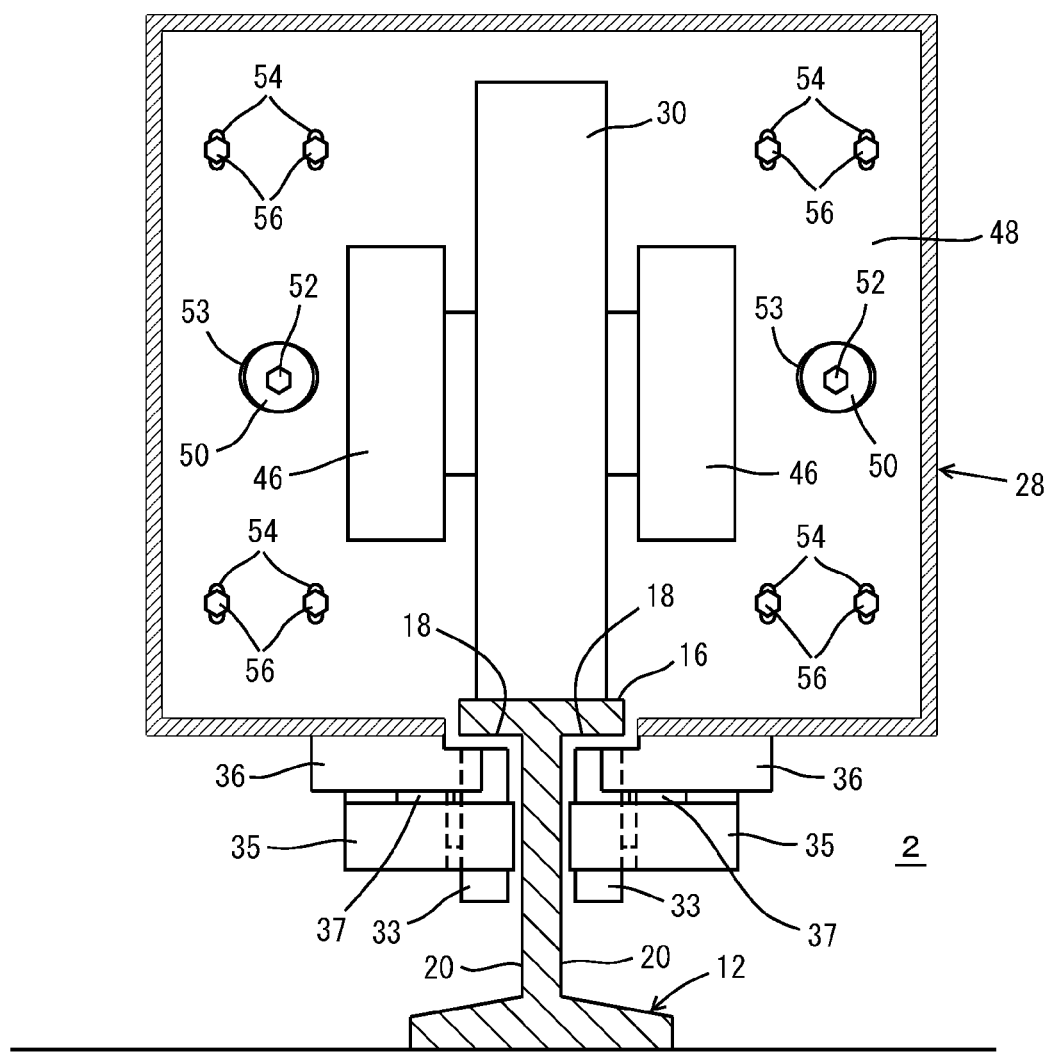
FIG. 3 is an enlarged cross-sectional view taken along line B-B in FIG. 1.

As shown in FIG. 3, the guide rollers 33 are attached to the support 28 by bearings 37, and the guide rollers 35 are attached to the support 28 by bearings 36. The guide rollers 32, 34, and 35 may always be in contact with the lower rail 12, or may be configured to come into contact with the lower rail 12 when the mast 8 tilts left or right beyond the allowable range.

Returning to FIG. 1, a pair of left and right drive wheels 40 are provided on the upper carriage 6, for example, are driven by an upper travel motor 41 to travel, and are in contact with the side surface of the upper rail 14. Also, for example, a pair of left and right guide rollers 42 are provided on the upper carriage 6 to guide the upper carriage 6 so that it does not shake left and right with respect to the upper rail 14. Further, sprockets, gears, or the like are provided inside of the upper carriage 6 in addition to the drive motor 41 for the chain or belt to raise and lower the transfer device 10. The upper carriage 6 may have any configuration.

FIG. 2 shows the structure of the lower carriage 4. An elevation motor 44 that raises and lowers the transfer device 10 is arranged to face the travel motor 24. Also, the center of gravity of the mast 8 is located directly above the drive wheel 22, and if the mast 8 is stood upright perpendicularly by the support 28, the center of gravity of the mast 8 will be the same to the position of contact between the drive wheel 22 and the lower rail 12, or in other words, the support will be directly above the center of the drive wheel 22 in the length direction. The main body 5 includes a pair of left and right bridges 26 and 26, and between the bridges 26 and 26 the transfer motor 11 and the transfer device 10 are accommodated when the transfer device 10 is lowered.

Figure 4:
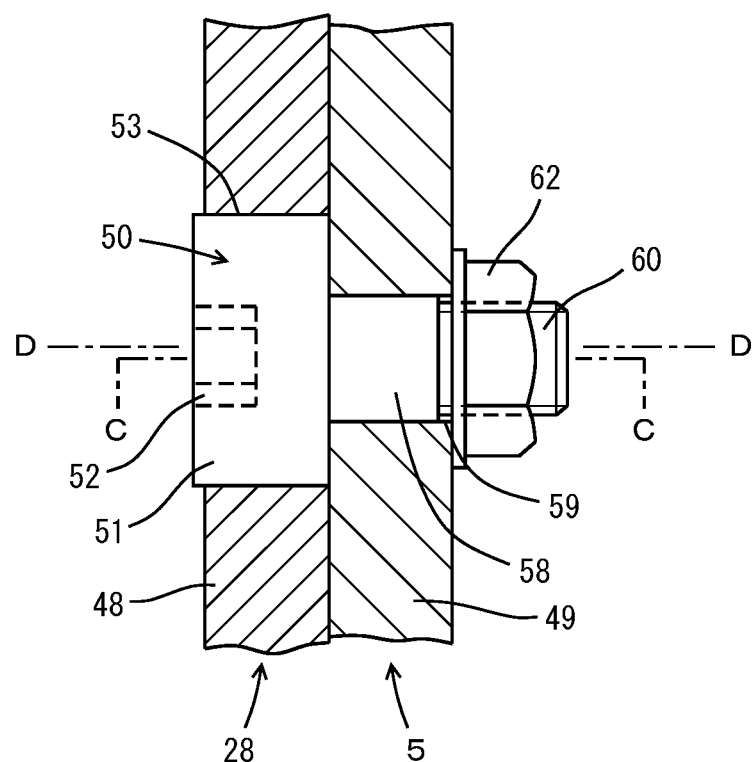
FIG. 4 is a diagram showing a structure for attaching an eccentric pin.

As shown in FIGS. 3 and 4, the driven roller 30 is arranged in the center in the left-right direction of the support 28, and is supported by a pair of bearings 46 and 46. For example, an attachment plate 48 on the support 28 is fixed by bolts 56 to an attachment plate 49 on the bridge 26, and is configured such that its height can be adjusted with eccentric pins 50. The eccentric pins 50 each include a circular plate 51 and a round bar 58 on the support 28, the center line C-C of the round bar 58 is eccentric from the center line D-D of the circular plate 51, and the center of an manipulation portion 52 such as a hexagonal hole is the same to the center line C-C. Further, the manipulation portion may be of any shape such as a nut shape instead of the hexagonal hole, and it is sufficient that the manipulation portion rotates the eccentric pin 50 according to a manual operation. A screw portion 60 is provided on the leading end of the round bar 58, the circular plate 51 is accommodated in a hole 53 of the attachment plate 48, the round bar 58 is accommodated in a round hole 59 of the attachment plate 49 and the screw portion 48 is fixed by the nut 62, such that the eccentric pin 50 is prevented from rotating. As shown in FIG. 3, the hole 53 has a shape slightly different from a circle so that the circular plate 51 may rotate around the manipulation portion 52. In the present preferred embodiment, the manipulation portion 52 preferably is provided on the support 28, but the eccentric pin 50 may be arranged such that the manipulation portion 52 is located on the bridge 26. Also, the eccentric pin 50 is a member that includes an axis on the attachment plate 48 and an axis on the attachment plate 49 and is able to be rotated by operating the manipulation portion 52.

The manipulation portion 52 is rotated with a hexagonal wrench or the like, and for example, the eccentric pin 50 is rotated about the axis C-C, and the support 28 is raised and lowered by about several millimeters with respect to the main body 5, for example. The example of FIG. 3 shows a grounded state (grounded position) in which the driven roller 30 is in contact with the lower rail 12. If the manipulation portion 52 is rotated from this state, a retracted state (retracted position) will be entered in which the driven roller 30 is lifted off the lower rail 12. The gap between the driven roller 30 and the lower rail 12 in the retracted state determines the allowable range with respect to rearward tilting of the mast 8. In the retracted state, the support 28 rises and the driven roller 30 is lifted from the lower rail 12. In the grounded state, the support 28 lowers and the driven roller 30 comes into contact with the lower rail 12. Also, the bolts 56 are inserted into a long holes 54 to adjust the height of the support 28 with the eccentric pin 50, and by fastening the bolts 56 at that position, the height of the support 28 may be fixed.

An operation of the present preferred embodiment will be described next. When the stacker crane 2 is installed between the lower rail 12 and the upper rail 14 in an automated warehouse, it is brought into the grounded state by lowering the support 28. At this time, the height of the support 28 is adjusted so that the mast 8 is perpendicular. Upon doing so, the stacker crane 2 may be installed, keeping the mast 8 in the perpendicular state, and since the orientation of the lower carriage 4 is stable, installation is easier. Also, at a time of performing maintenance, if the orientation of the lower carriage 4 is stabilized so that the mast 8 is kept in the perpendicular state, the task is easier. Furthermore, the stacker crane 2 may be moved by pushing manually or the like when installing and when performing maintenance. It is difficult to move the stacker crane 2 by pushing manually, when the support is in the retracted state, because the orientation of the lower carriage 4 is unstable and the mast 8 does not stand on its own.

During normal operation of the stacker crane 2, the support 28 is raised so that the driven roller 30 is lifted off the lower rail 12. Even if the upper and lower carriages 4 and 6 come out of synchronization and the mast 8 tilts rearward within the allowable range, a strong force is not exerted on the connection between the mast 8 and the lower carriage 4. Accordingly, the durability and reliability of the connection are improved, and the weight of the connection portion is reduced.

If the mast 8 tilts rearward beyond the allowable range, the driven roller 30 comes into contact with the lower rail 12 and further rearward tilting is prevented. Also, if the mast 8 tilts forward beyond the allowable range, the guide roller 33 comes into contact with the guide surface 18 of the lower rail 12 and further forward tilting is prevented.

The center of gravity of the mast 8 in the grounded state is located directly above the center of the drive wheel 22. Therefore, the weight from the mast 8 is exerted directly on the point of contact between the drive wheel 22 and the lower rail 12, and there is no moment of force that causes the mast 8 to tilt.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A stacker crane, comprising:
    a lower carriage including a lower drive wheel in contact with a lower rail, a lower travel motor that drives the lower drive wheel, and a support located apart from the lower drive wheel along a length direction of the lower rail;
    an upper carriage including an upper drive wheel in contact with an upper rail, and an upper travel motor that drives the upper drive wheel; and
    a mast fixed to the lower carriage, standing upward from the lower carriage, connected to the upper carriage, and having a transfer device attached movably up and down; wherein
    the lower carriage is provided with a displacement mechanism that raises and lowers the support between a grounded position supported by the lower rail and a retracted position lifted upward off the lower rail.

2. The stacker crane according to claim 1, wherein
    the lower carriage includes a main body including the lower drive wheel and the lower travel motor, and the support located either in front of or behind the main body; and
    the displacement mechanism includes:
        at least an eccentric pin including a circular plate, a round bar including a base end that is integrated with the circular plate and is eccentric relative to a center of the circular plate, a screw portion provided at a leading end of the round bar, and a manipulation portion that rotates the circular plate;

at least a receiving hole provided in the support for the circular plate or the round bar; and at least a receiving hole provided in the main body for the round bar or the circular plate.

3. The stacker crane according to claim 2, wherein the displacement mechanism causes the support to move up and down with respect to the main body between the retracted position and the grounded position.

4. The stacker crane according to claim 3, wherein the displacement mechanism is configured to make the mast perpendicular to the main body when the stacker crane is installed between the lower rail and the upper rail and also when the stacker crane is stopped for maintenance.

5. The stacker crane according to claim 4, wherein at a position along the length direction of the lower rail, the mast is fixed directly above the lower drive wheel.

6. The stacker crane according to claim 5, wherein the support includes at least a roller in contact with an upper surface of the lower rail at the grounded position and lifted off the lower rail at the retracted position, and a guide roller facing a guide surface on an underside of the lower rail at an opposite position to the roller;

the guide roller is attached to the support with a gap between the guide roller and the guide surface of the lower rail both at the grounded position and at the retracted position;

neither the roller nor the guide roller comes into contact with the lower rail when tilting of the mast to the lower carriage is within an allowable range; and if the tilting of the mast to the lower carriage exceeds the allowable range, the roller or the guide roller comes into contact with the lower rail.

7. The stacker crane according to claim 1, wherein the support includes a roller in contact with an upper surface of the lower rail at the grounded position and lifted off the lower rail at the retracted position.

8. The stacker crane according to claim 7, wherein the support includes at least a guide roller that faces a guide surface on an underside of the lower rail, is at an opposite position to the roller and is attached to the support with a gap between the guide roller and the guide surface of the lower rail both at the grounded position and at the retracted position.

9. The stacker crane according to claim 1, wherein, when the support is grounded at the grounded position, along the length direction of the lower rail, a center of gravity of the mast and a position of contact between the lower drive wheel and the lower rail are located at a same point.

10. The stacker crane according to claim 1, wherein the mast is a single mast;

the lower drive wheel is provided only at one position along the lower rail; and the transfer device and the support are positioned on a same side of the mast.

11. A method for operating a stacker crane that includes a lower carriage including a lower drive wheel in contact with a lower rail, a lower travel motor that drives the lower drive wheel, a support located apart from the lower drive wheel along a length direction of the lower rail, an upper carriage including an upper drive wheel in contact with an upper rail, an upper travel motor that drives the upper drive wheel, and a mast fixed to the lower carriage, standing upward from the lower carriage, connected to the upper carriage, and having a transfer device attached movably up and down, the lower carriage is provided with a displacement mechanism that raises and lowers the support between a grounded position supported by the lower rail and a retracted position lifted upward off the lower rail, the method comprising:

lowering the support to the grounded position supported by the lower rail when the stacker crane is installed between the lower rail and the upper rail and when the stacker crane is stopped to perform maintenance; and raising the support to the retracted position lifted off the lower rail when operating the stacker crane.

\* \* \* \* \*